(12) United States Patent
Bertz et al.

(10) Patent No.: US 7,617,336 B1
(45) Date of Patent: Nov. 10, 2009

(54) BLADE COMPUTING SYSTEM

(75) Inventors: Lyle Thomas Bertz, Lee's Summit, MO (US); Frederick Carl Rogers, Olathe, KS (US); John Michael Everson, Kansas City, MO (US); Keith Pinney, Olathe, KS (US); Salvador Cerda, Jr., Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1122 days.

(21) Appl. No.: 11/099,100

(22) Filed: Apr. 5, 2005

(51) Int. Cl.
*G06F 3/01* (2006.01)
(52) U.S. Cl. .......................... 710/8; 710/104
(58) Field of Classification Search .............. 710/8, 710/104, 100; 361/600; 307/104
See application file for complete search history.

(56) References Cited

U.S. PATENT DOCUMENTS

| | | | |
|---|---|---|---|
| 5,847,447 A | 12/1998 | Rozin et al. | |
| 6,073,855 A | 6/2000 | MacKenthun | |
| 6,173,899 B1 | 1/2001 | Rozin | |
| 6,688,965 B1 * | 2/2004 | Crippen et al. | 454/184 |
| 7,184,269 B2 * | 2/2007 | Campbell et al. | 361/700 |
| 7,215,552 B2 * | 5/2007 | Shipley et al. | 361/721 |
| 7,244,889 B2 * | 7/2007 | Fanuf et al. | 174/17 VA |
| 7,550,870 B2 * | 6/2009 | Reynolds et al. | 307/32 |
| 2002/0036977 A1 | 3/2002 | Lenssen et al. | |
| 2002/0129633 A1 | 9/2002 | Joki et al. | |
| 2002/0182937 A1 | 12/2002 | Kukita et al. | |
| 2003/0020332 A1 | 1/2003 | Giannopoulos et al. | |
| 2004/0066249 A1 | 4/2004 | Garner et al. | |

OTHER PUBLICATIONS

IBM Almaden Research Center, Collective Intelligent Bricks (CIB)—Hardware [online], [retrieved on May 11, 2004. Retrieved from the Internet <URL: http://almaden.ibm.com/StorageSystems/autonomic_storage/CIB_Hardware/index.shtml>.

* cited by examiner

*Primary Examiner*—Albert W Paladini

(57) ABSTRACT

A blade computing system is provided according to an embodiment of the invention. The blade computing system includes a substrate, at least one capacitive communication system formed on the substrate and configured to capacitively exchange data communications, and at least one inductive power system formed on the substrate and configured to inductively receive electrical power. The blade computing system further includes one or more baffles formed on the substrate and positioned between a capacitive communication system of the at least one capacitive communication system and an inductive power system of the at least one inductive power system. The blade computing system further includes a processing system formed on the substrate and coupled to the inductive power system and the capacitive communication system.

33 Claims, 10 Drawing Sheets

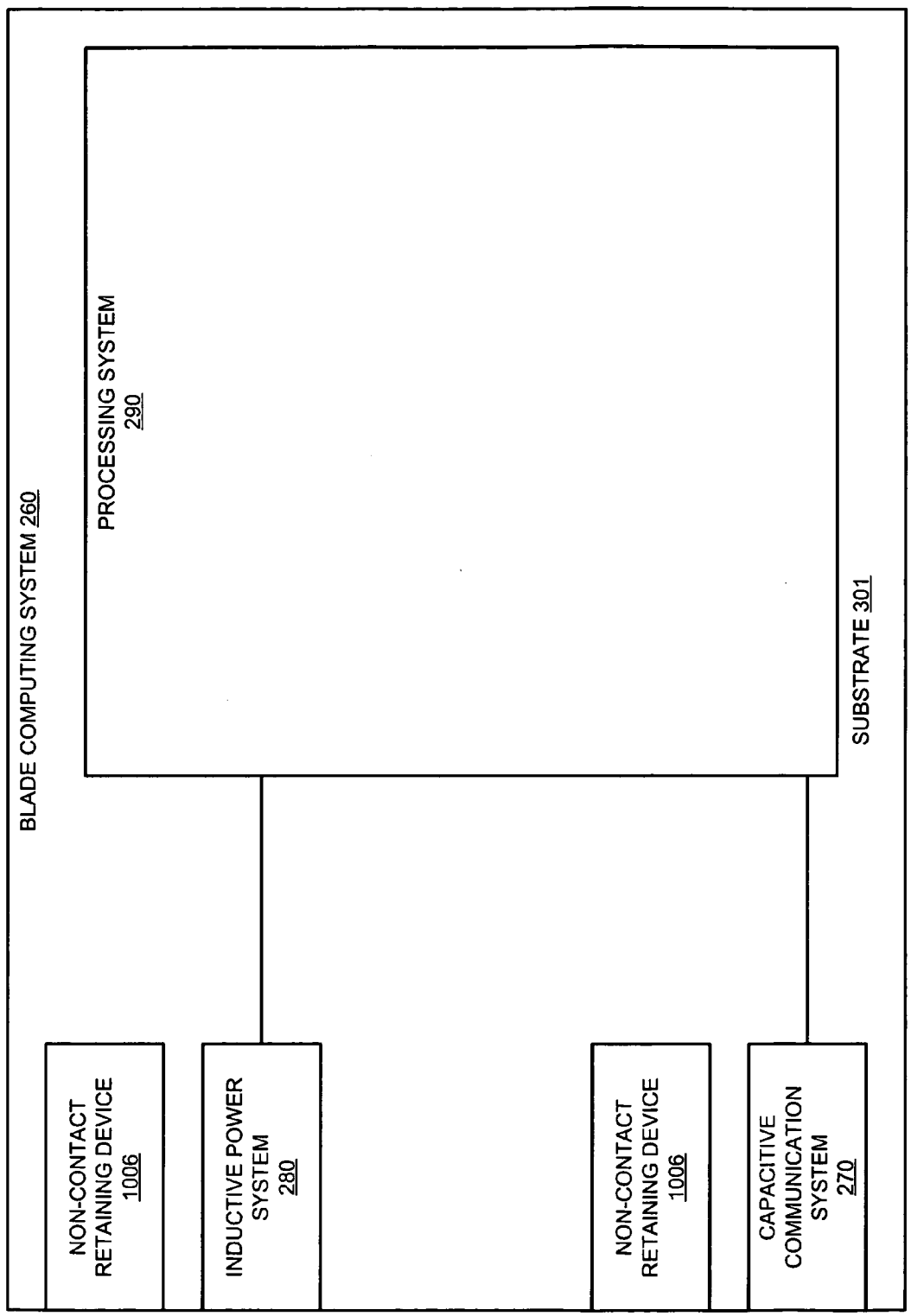

BLADE COMPUTING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to a blade computing system, and in particular, to a blade computing system for a blade server system.

2. Description of the Prior Art

Modern communications and computing centers increasingly rely on large numbers of computer processors in order to perform many types of communication and computing operations. One increasingly popular and widespread type of computer platform is a blade server system. The blade server system can be connected to a plurality of communication links and therefore can perform many types of communications operations. A blade server system can include many processors, and therefore can perform a large number of processing operations.

FIG. 1 shows a typical prior art blade server. In the prior art, a blade server system typically comprises a chassis, a backplane inside the chassis, and a large number of blade servers that are connected to the backplane. Electrical power is transferred from the backplane to the blade server by a power cable. In addition, data is communicated between the backplane and the blade server by a data cable.

A prior art blade server system has drawbacks. A prior art blade server system typically uses a series of power and data transmission cables to connect to each blade component. These cables are expensive. A power cable typically costs fifteen to twenty-five dollars, while a data transmission cable typically costs seven to forty dollars.

It takes time to properly insert a blade into the chassis or to remove a blade from the chassis using such cables. The profusion of cables consumes chassis space and can be confusing. The cable connectors can fail during installation or removal operations. Pins can be damaged or bent during these operations. Broken pins in a blade chassis may actually ruin the chassis. The connectors tend to be bulky and require large amounts of space in the chassis. The prior art cables generate heat.

SUMMARY OF THE INVENTION

A blade computing system is provided according to an embodiment of the invention. The blade computing system comprises a substrate, at least one capacitive communication system formed on the substrate and configured to capacitively exchange data communications, and at least one inductive power system formed on the substrate and configured to inductively receive electrical power. The blade computing system further comprises one or more baffles formed on the substrate and positioned between a capacitive communication system of the at least one capacitive communication system and an inductive power system of the at least one inductive power system. The blade computing system further comprises a processing system formed on the substrate and coupled to the inductive power system and the capacitive communication system.

A blade computing system is provided according to an embodiment of the invention. The blade computing system comprises a substrate and a status selector system formed on the substrate and configured to generate a status input. The blade computing system further comprises a processing system formed on the substrate and coupled to the status selector system. The processing system is configured to receive the status input from the status selector system, set the operational status of the blade computing system based on a current operational status and the status input, and implement the operational status in the blade computing system.

A blade computing system is provided according to an embodiment of the invention. The blade computing system comprises a substrate and a blade beacon formed on the substrate and configured to generate a beacon display. The blade computing system further comprises a processing system formed on the substrate and coupled to the blade beacon. The processing system is configured to receive a beacon message, activate the blade beacon if a beacon on state is indicated by the beacon message, and de-activate the blade beacon if a beacon off state is indicated by the beacon message.

A blade computing system is provided according to an embodiment of the invention. The blade computing system comprises a substrate and one or more non-contact retaining devices formed on the substrate and configured to retain the blade computing system in a chassis of a blade server system. The blade computing system further comprises a processing system formed on the substrate.

A method of setting an operational status of a blade computing system is provided according to an embodiment of the invention. The method comprises generating a status input in a status selector system of the blade computing system, setting the operational status of the blade computing system based on a current operational status and the status input, and implementing the operational status in the blade computing system.

A method of activating a blade beacon of a blade computing system is provided according to an embodiment of the invention. The method comprises receiving a beacon message in the blade computing system, activating the blade beacon if a beacon on state is indicated by the beacon message, and de-activating the blade beacon if a beacon off state is indicated by the beacon message.

A method of activating a blade beacon of a particular blade computing system in a blade server system that includes a plurality of blade computing systems is provided according to an embodiment of the invention. The method comprises receiving a beacon message in the blade server system, determining that a destination of the beacon message is the particular blade computing system, and routing the beacon message to the particular blade computing system.

BRIEF DESCRIPTION OF THE DRAWINGS

The same reference number represents the same element on all drawings.

FIG. 10 shows a blade computing system according to another embodiment of the invention.

DETAILED DESCRIPTION OF THE PREFERRED EMBODIMENT

FIGS. 2-10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
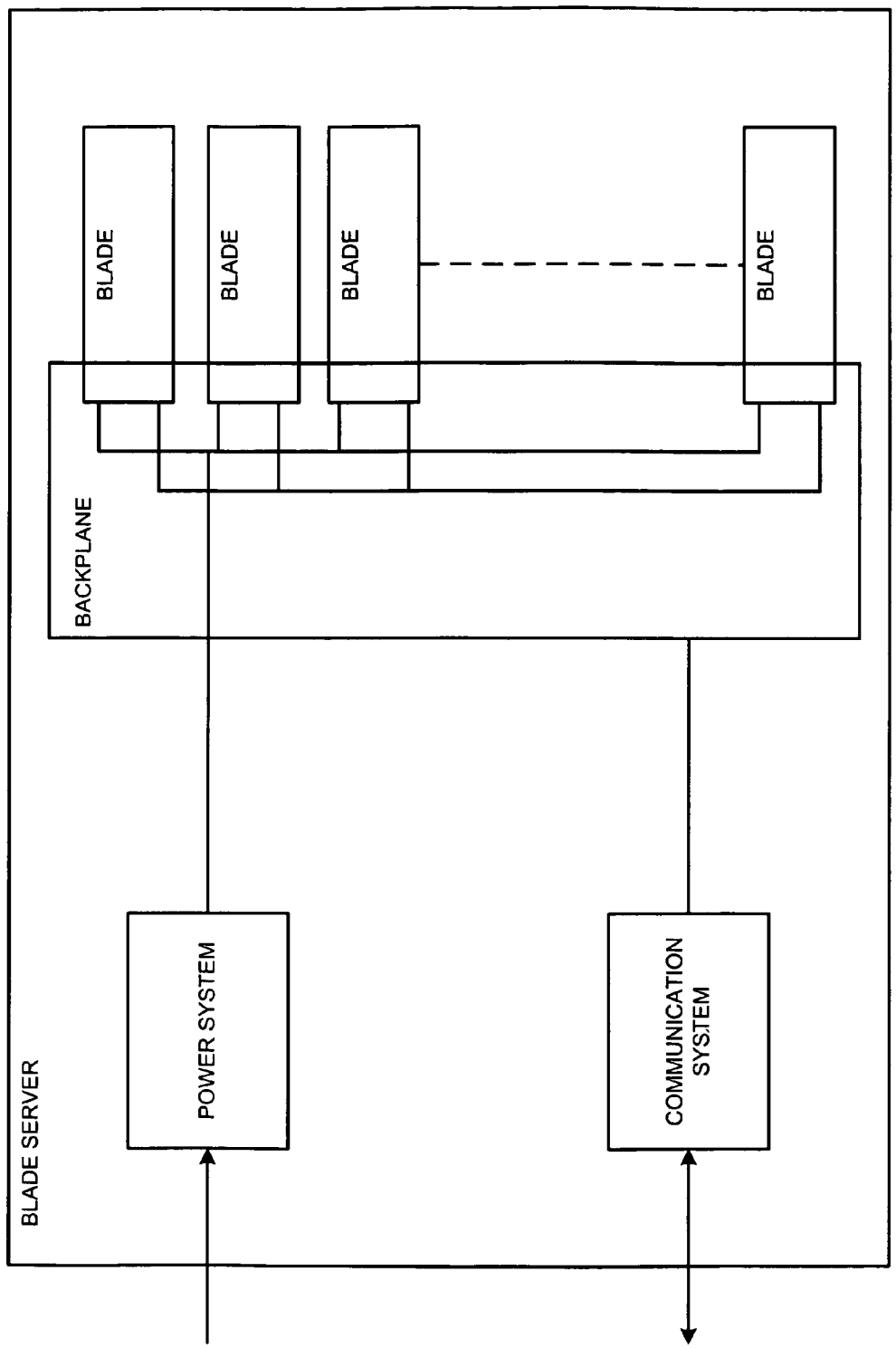
FIG. 1 shows a typical prior art blade server.
Figure 2:
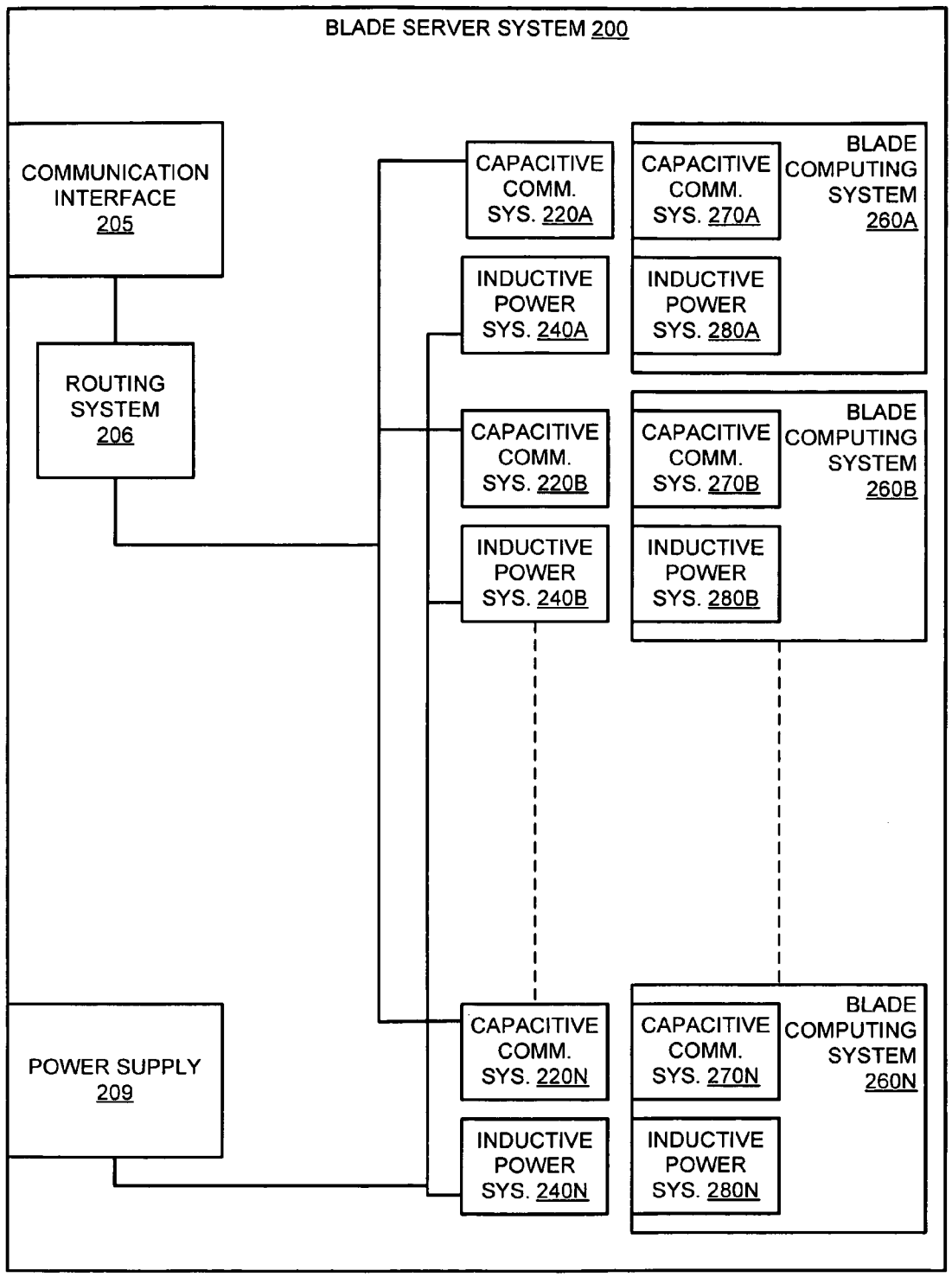
FIG. 2 shows a blade server system according to an embodiment of the invention.

FIG. 2 shows a blade server system 200 according to an embodiment of the invention. The blade server system 200 includes a communication interface 205, a routing system 206, a power supply 209, a plurality of capacitive communication systems 220A-220N, and a plurality of inductive-power systems 240A-240N. The blade server system 200 further includes a plurality of blade computing systems 260A-260N. The blade computing systems 260A-260N are modular processing components, and can be inserted and removed from the blade server system 200. The blade server system 200 therefore comprises a server system that provides a large data processing and/or data storing capability to clients.

A blade server system 200 can be comprised of a large number of blades, wherein the blades can communicate with each other and the outside world. The blade computing system 260 can perform communication operations. The blade server system 200 can perform data processing operations. The blade server system 200 can perform data storage operations. The blade server system 200 can perform the above communication, processing, and storage operations for any of a variety of clients, including for external clients and for other blade computing systems as internal clients.

The blade server system 200 can be configured and re-configured by adding, removing, or changing various blades. The capabilities of the blade server system 200 can be increased, decreased, or modified by adding, removing, or replacing individual blade computing systems.

The plurality of capacitive communication systems 220A-220N are coupled to the routing system 206, which in turn is coupled to the communication interface 205. The plurality of capacitive communication systems 220A-220N capacitively exchange data communications between the routing system 206 and the plurality of blade computing systems 260A-260N. The communication interface 205 is configured to be coupled to a communication link, including a wireline communication link or a wireless communication link. The communication interface 205 therefore can include any necessary transmitter and receiver devices.

The plurality of inductive power systems 240A-240N are coupled to the power supply 209. The power supply is configured to connect to an external power source in order to receive electrical power. The plurality of inductive power systems 240A-240N receive electrical power from the power supply 209. The plurality of inductive power systems, 240A-240N inductively provide electrical power to each blade computing system of the plurality of blade computing systems 260A-260N.

A blade computing system 260 of the plurality of blade computing systems 260A comprises a blade (i.e., a computer on a card) that is modular in design. Each blade computing system 260 can include a capacitive communication system 270. The capacitive communication system 270 can capacitively exchange data communications with the corresponding capacitive communication system 220 of the blade server system 200. By using a capacitance effect between the two capacitive communication systems, the blade computing system 260 does not need to make a physical/mechanical connection with the blade server system 200. The communication capacity can be varied according to the size and separation distance of the two capacitive communication systems, among other things. In addition, the blade computing system 260 (and the blade server system 200) can include multiple capacitive communication systems 270 for additional data communication capacity or for redundancy, for example.

The routing system 206 can route a communication between a particular capacitive communication system 220 and external devices. The routing system 206 can also route a communication between a particular capacitive communication system 220 and other (internal) blade computing systems. In one embodiment, the routing system 206 can comprise an Ethernet switch.

In addition, each blade computing system 260 can include an inductive power system 280. The inductive power system 280 of the blade computing system 2-60 can inductively receive electrical power from a corresponding inductive power system 240 of the blade server system 200. By using an inductance effect between the two inductive power systems, the blade computing system 260 does not need to make a physical/mechanical connection with the blade server system 200. In addition, the blade computing system 260 can include multiple inductive, power systems 280 for additional electrical power capacity or redundancy, for example.

The blade server system 200 can optionally include cooling fans or other cooling systems. However, due to the lack of cabling, the blade server system 200 advantageously may not need or require any cooling devices. Likewise, the individual blade computing systems 260A-260N may not need cooling fans in order to operate.

Figure 3:
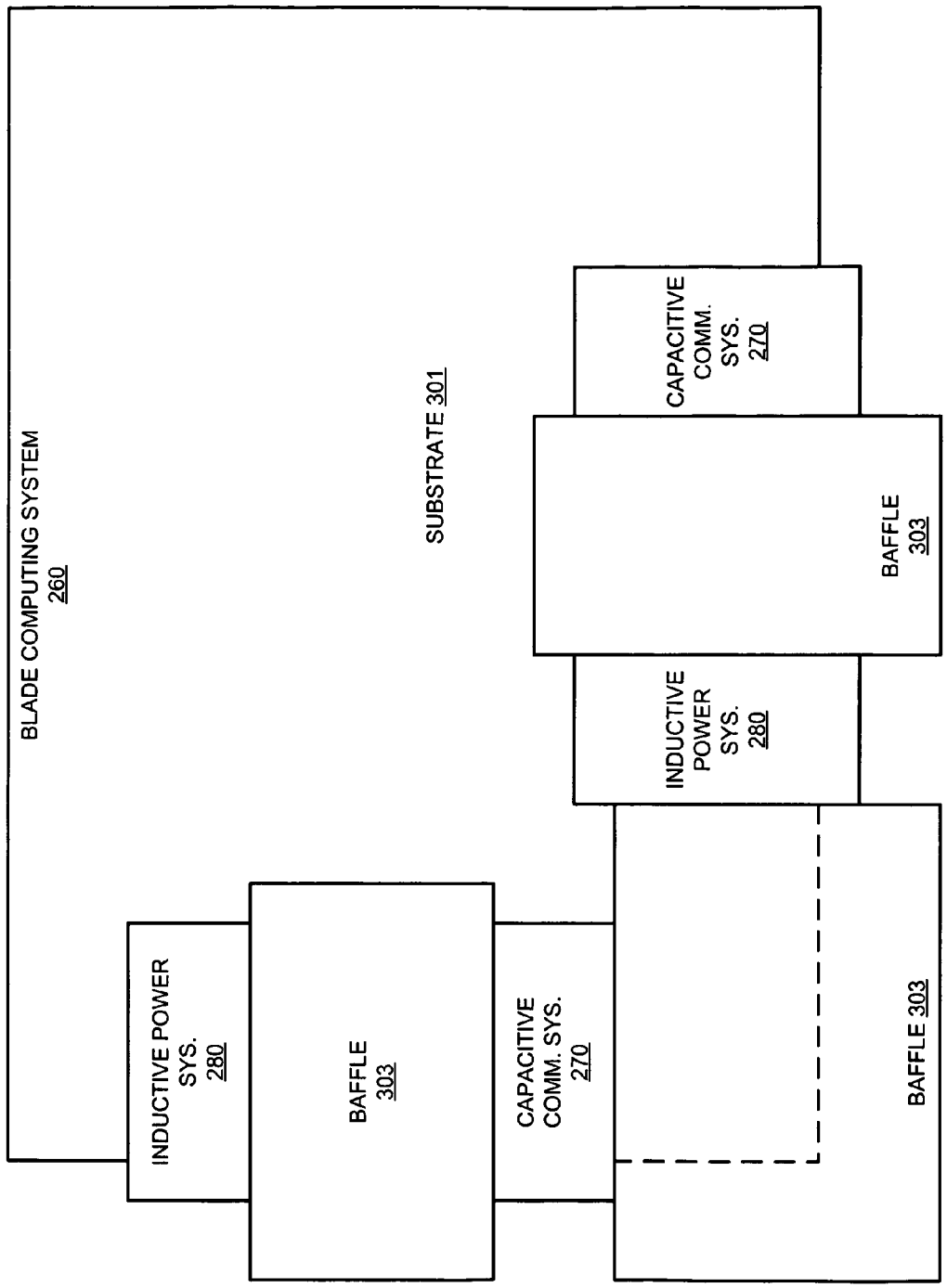
FIG. 3 shows a blade computing system according to an embodiment of the invention.

FIG. 3 shows a blade computing system 260 according to an embodiment of the invention. The blade computing system 260 can include a substrate 301 and one or more capacitive communication systems 270 and one or more inductive power systems 280 formed on the substrate 301. The substrate 301 can comprise any manner of circuit board, card, etc. on which the various components can be formed. As a result, the blade computing system 260 can have a substantially planar shape, for example. In this embodiment, the capacitive communication systems 270 and the inductive power systems 280 are separated by one or more baffles 303. The baffles 303 provide physical separation between the one or more capacitive communication systems 270 and the inductive power systems 280. In addition, the baffles 303 can provide electromagnetic shielding between the systems. Furthermore, the baffles 303 can provide proper spacing between the blade computing system 260 and the blade server system 200 (such as desired spaces between corresponding capacitive and inductive systems). Any extra space created by the baffles 303 can be used for other features of the blade computing system 260, such as space for transmission wiring, for example. Moreover, the blade computing system, including the baffles 303, can be encased in any manner of casing, such as a casing made of an electrical insulator material.

It can be seen from this figure that a blade computing system 260 can include multiple capacitive communication systems 270 and/or multiple inductive power systems 280. Multiple capacitive communication systems 270 and/or multiple inductive power systems 280 can be included for redundancy. Multiple capacitive communication systems 270 and/or multiple inductive power systems 280 can be included for increased power/data transmission capacity. For example, the numbers of capacitive communication systems 270 and inductive power systems 280 can be increased or decreased in order to increase or decrease the power and/or data transmission capacity. Multiple capacitive communication systems 270 and/or multiple inductive power systems 280 can be included for increased alignment robustness. For example, where a blade computing system 260 includes multiple capacitive communication systems 270 and inductive power systems 280, mis-alignment may not result in power/data loss.

Figure 4:
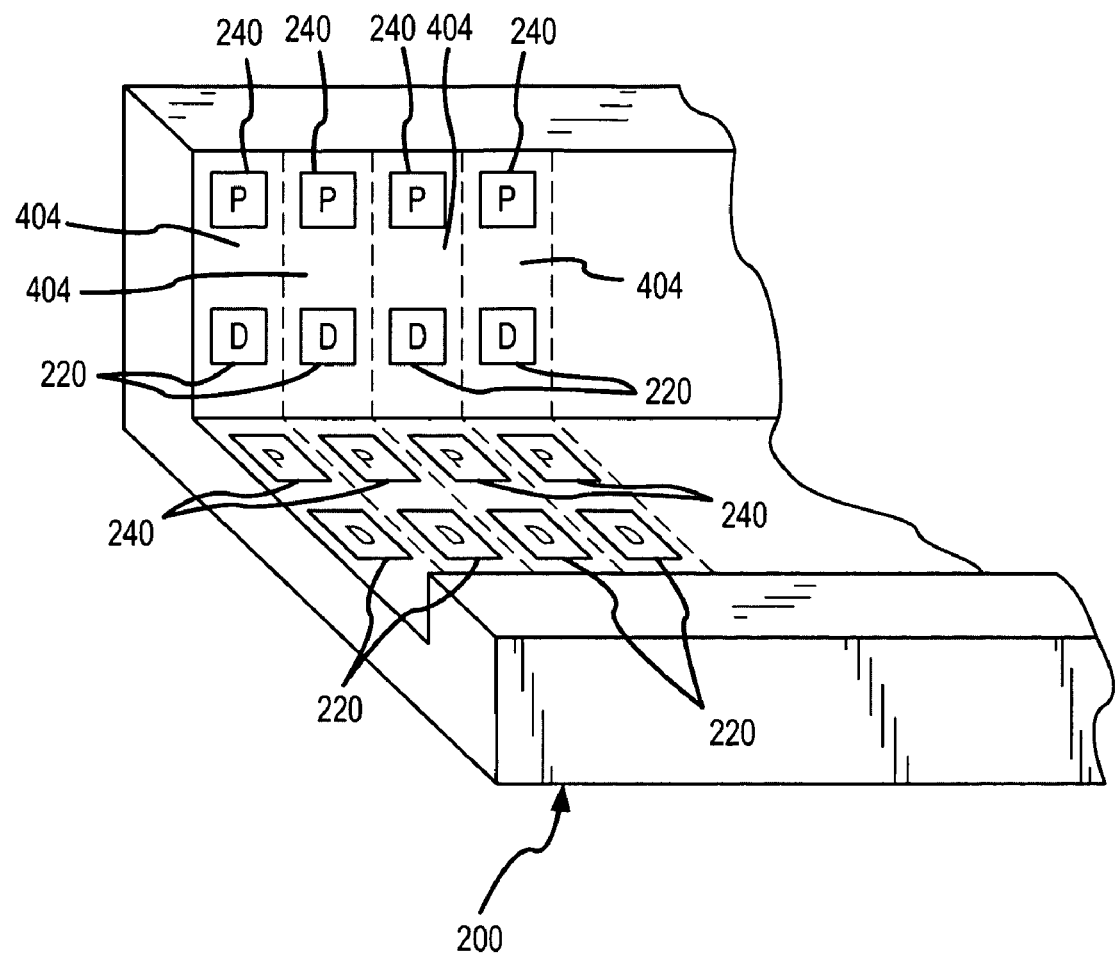
FIG. 4 shows several of the multiple blade spaces of the blade server system, wherein the blade spaces receive corresponding blade computing systems.

FIG. 4 shows several of the multiple blade spaces 404 of the blade server system 200, wherein the blade spaces 404 receive corresponding blade computing systems 260A-260N. The blade spaces 404 can be populated with any number of blade computing systems 260A-260N. The blade server system 200 can include multiple capacitive communication systems 220A-220N and multiple inductive power systems 240A-240N corresponding to the blade computing systems 260A-260N.

In one embodiment, the blade spaces 404 are substantially the same in size. Alternatively, the blade spaces 404 can differ in size. However, it should be understood that a blade space 404 can accept blade computing systems of varying sizes.

Figure 5:
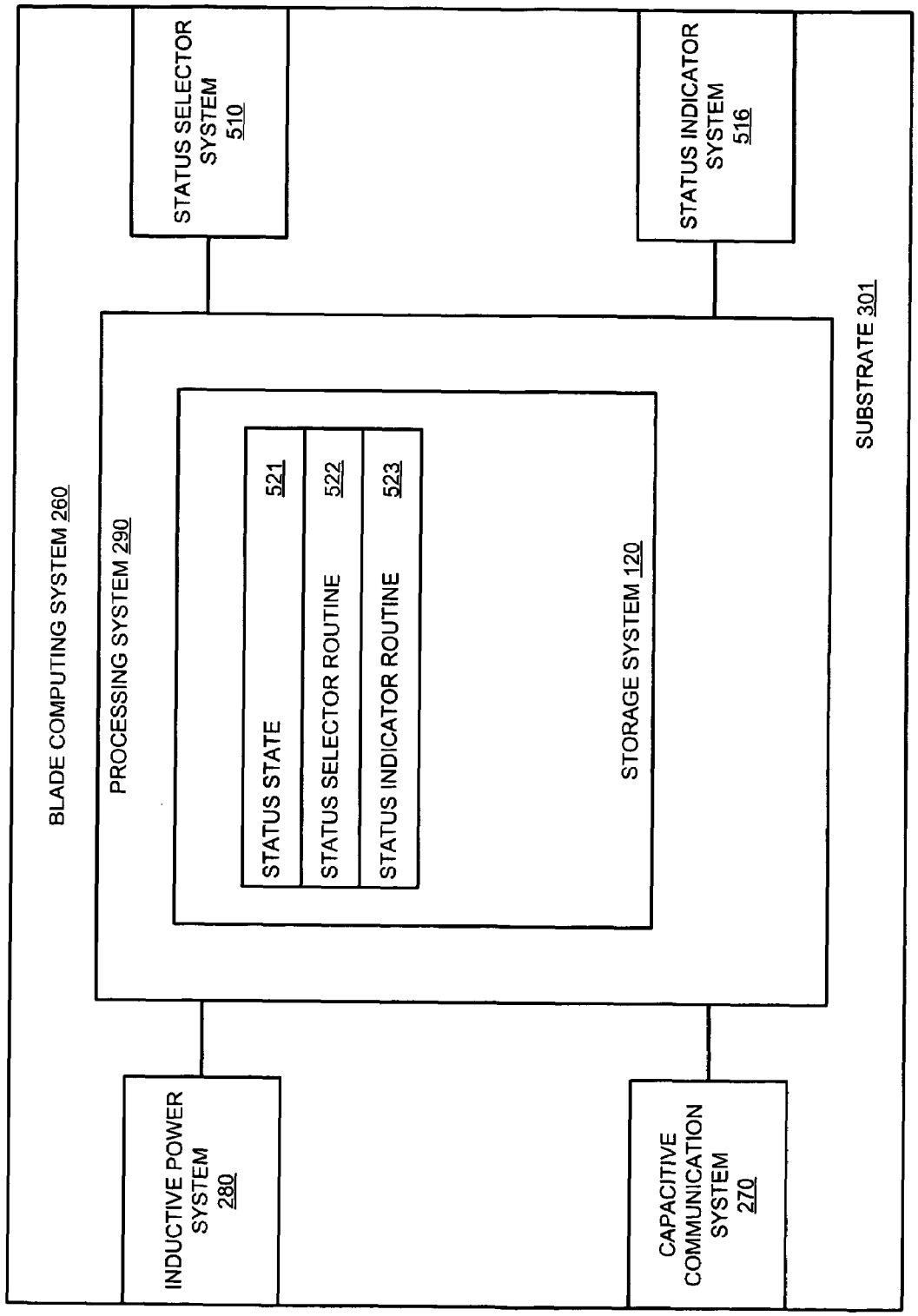
FIG. 5 shows a blade computing system according to an embodiment of the invention.

FIG. 5 shows a blade computing system 260 according to an embodiment of the invention. The blade computing system 260 includes a substrate 301, a capacitive communication system 270, an inductive power system 280, a processing system 290, a status selector system 510, and a status indicator system 516.

In operation, the status selector system 510 can be used in order to alter the operational status, of the blade computing system 260. For example, the status selector system 510 can be used in order to put the blade computing system 260 into an "online" state or into an "offline" state. A technician or operator can manually operate the status selector system 510 in order to generate a status input. The status input is transmitted to the processing system 290 by the status selector system 510. The processing system 290 performs the status operation, including wrapping up processing, shutting-down processing, shutting down communications, and going into a low-power state or shutting off electrical power. In addition, the status operation can include any other shut-down operations. Moreover, the processing system 290 can perform operations to bring the blade computing system 260 back up to an online status, including powering-up all or part of the blade computing system 260, re-initiating communications, re-initiating processing, etc.

The substrate 301 comprises a base for the various components of the blade computing system 260. The substrate 301 in one embodiment is substantially planar. The substrate 301 in one embodiment comprises a circuit board.

The processing system 290 is coupled to the inductive power system 280, the capacitive communication system 270, the status selector system 510, and the status indicator system 516. The processing system 290 can include any manner of processing routines and any manner of data. The processing system 290 can conduct communications with external devices. The processing system 290 can perform processing operations on digital data. The processing system 290 can include one or more processors. In addition, the processing system 290 can further include other chip components or other circuitry.

The processing system 290 can include any manner of storage system 120. The storage system can store, among other things, a status state 521, a status selector routine 522, and a status indicator routine 523.

The status selector system 510 comprises an input device that receives a manual status input from an operator or technician. The input device can comprise any manner of switch, toggle, touch pad, etc. In response to a manual input, the status selector system 510 generates a status input to the processing system 290. For example, if the input device comprises a switch, the technician or operator can select an "online" status or an "offline" status, for example.

The offline status input can be selected by the technician or operator in order to signal the processing system 290 to put the blade computing system 260 into an offline state. The offline state may be desirable in order for the technician or operator to remove, troubleshoot, or service the blade computing system 260, for example. The processing system 290 can interpret the offline status input as a command to finish current processing jobs, decline pending processing jobs, and then enter an offline state. In the resulting offline state, data cannot be lost in subsequent blade computing system removal, troubleshooting, or servicing operations, for example.

Conversely, the online status input can be selected by the technician or operator in order to put the processing system 290 into operation. The processing system 290 therefore can perform any manner of processing and communications operations when in the online state.

The status indicator system 516 comprises an indicator that can indicate at least an online status and an offline status. Additionally, the indicator can indicate an error status. Other status characteristics of the blade computing system 260 can also be indicated by the indicator. Consequently, the processing system 290 can generate a status indication signal to the status indicator system 516. The status indicator system 516 therefore can indicate the status of the blade computing system 260. For example, the status indicator system 516 can generate a light signal that indicates an online status, an offline status, and even an error status. As a result, the technician or operator can enable and disable a particular blade computing system of a blade server.

In one embodiment, the status indicator system 516 can comprise one or more lights. In one embodiment, a light can comprise a Light Emitting Diode (LED). However, other lights are contemplated and are within the scope of the description and claims. For example, an indicator light can comprise a incandescent lamp, a fluorescent lamp, a text or graphics display, etc.

In one embodiment, the status indicator system 516 can include an "online" indicator light, and "offline" indicator light, and optionally an "error" indicator light. As discussed above, other indicator lights can be incorporated into the status indicator system 516.

In one embodiment, the status indicator system 516 can comprise one or more lights that change color or intensity in order to indicate status. For example, a light can emit a first color for an online status and a second color for an offline status, such as green and red, for examples. A third color can indicate an error status. LEDs exist that can emit multiple colors, depending on LED operating characteristics.

In yet another embodiment, the status indicator system 516 can comprise some manner of display. For example, the status indicator system 516 can comprise a multi-segment display, a Liquid Crystal Display (LCD), etc. As a result, the status indicator system 516 can display any manner of indicator symbol, graphic, text, etc.

The status state 521 stores an operational state of the blade computing system 260. The status state 521 can store an "online" state during normal operation of the blade computing system 260. The status state 521 can store an "offline" state when operations of the blade computing system 260 have been suspended. The status state 521 can store an "error" state when the blade computing system 260 is operating abnormally or when operations of the blade computing system 260 have been suspended by other than a status input from the technician or operator. Other status states are contemplated and are within the scope of the description and claims.

The status selector routine 522 receives the status inputs from the status selector system 510. The status selector routine 522 consults the status state 521 and changes the status state 521 based on the status inputs. In addition, the status selector routine 522 can initiate or perform status change operations, such as online or offline operations.

The status indicator routine 523 controls the status indicator system 516 according to the status state 521. The status indicator routine 523 can cause the status indicator system 516 to generate an online status indication if the status state 521 is in an online state. The status indicator routine 523 can cause the status indicator system 516 to generate an offline status indication if the status state 521 is in an offline state. The status indicator routine 523 can cause the status indicator system 516 to generate an error status indication if the status state 521 is in an error state.

Figure 6:
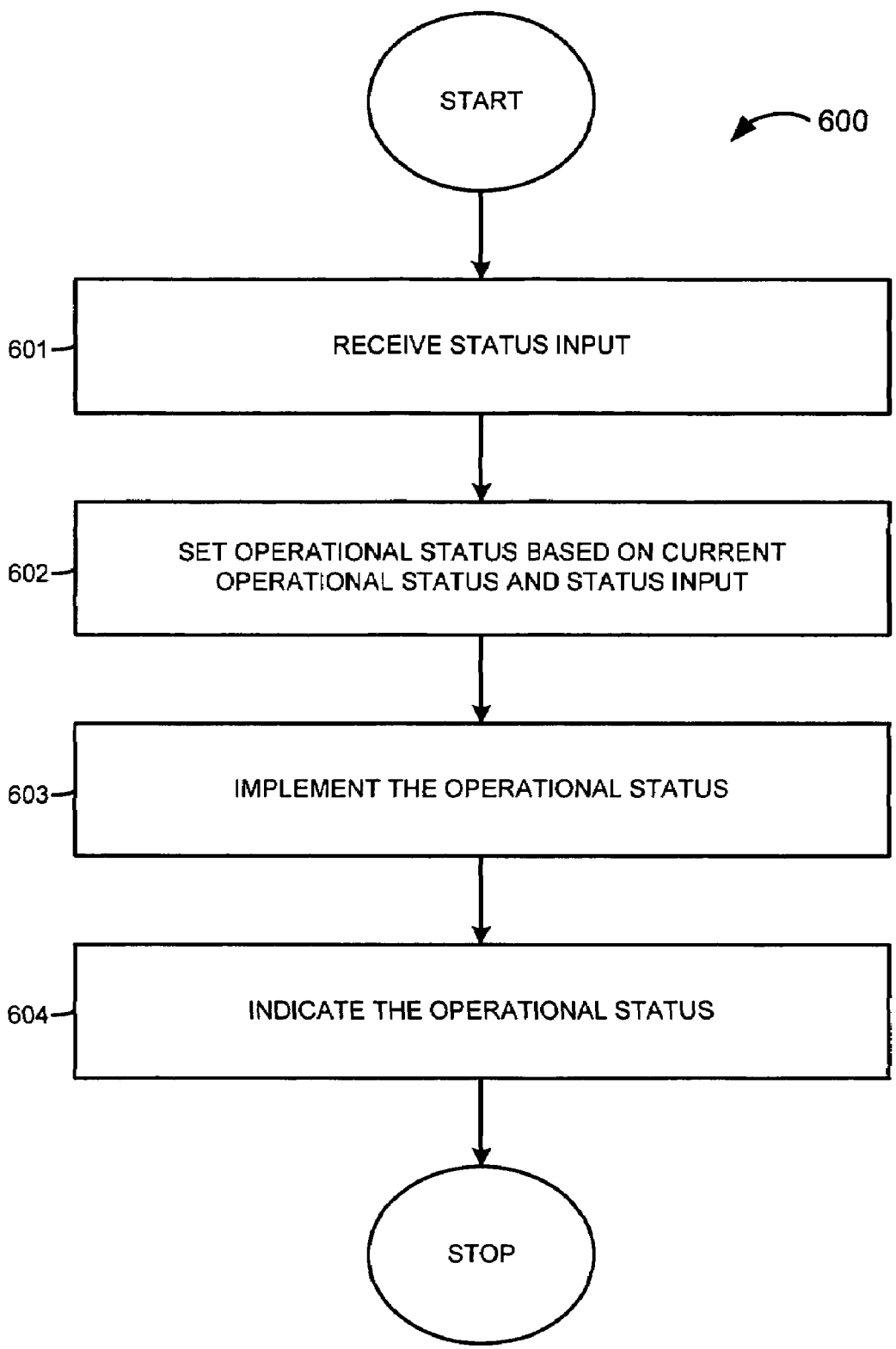
FIG. 6 is a flowchart of a method of setting an operational status of a blade computing system according to an embodiment of the invention.

FIG. 6 is a flowchart 600 of a method of setting an operational status of a blade computing system 260 according to an embodiment of the invention. In step 601, the blade computing system 260 receives a status input. In one embodiment, the status input is received from the status selector system 510, wherein the status input comprises a manual input received from a technician or operator. However, it should be understood that alternatively the status input can come from other sources, such as from another blade computing system 260 of the blade server system 200 or from a device external to the blade server system 200.

In step 602, the processing system 290 of the blade computing system 260 sets the operational status of the blade computing system 260. The operational status is based on the current operational status and on the status input. For example, if the current operational status is an "online" status, then when the status input is received the processing system 290 can set the operational status to "offline", and vice versa.

In step 603, the processing system 290 implements the operational status. The operational status can be implemented in order to enable and disable operations of the processing system 290, including disabling communications operations, disabling processing operations, and disabling data storage operations.

In step 604, the processing system can indicate the operational status. The indicating can include any manner of indication to a technician or operator. The indicating can be performed by the status indicator system 516. In one embodiment, the indication is a visual indication, wherein the processing system 290 can command the status indicator system 516 to light a status indicator light, as previously discussed. However, it should be understood that other status indicators are contemplated and are within the scope of the description and claims.

Figure 7:
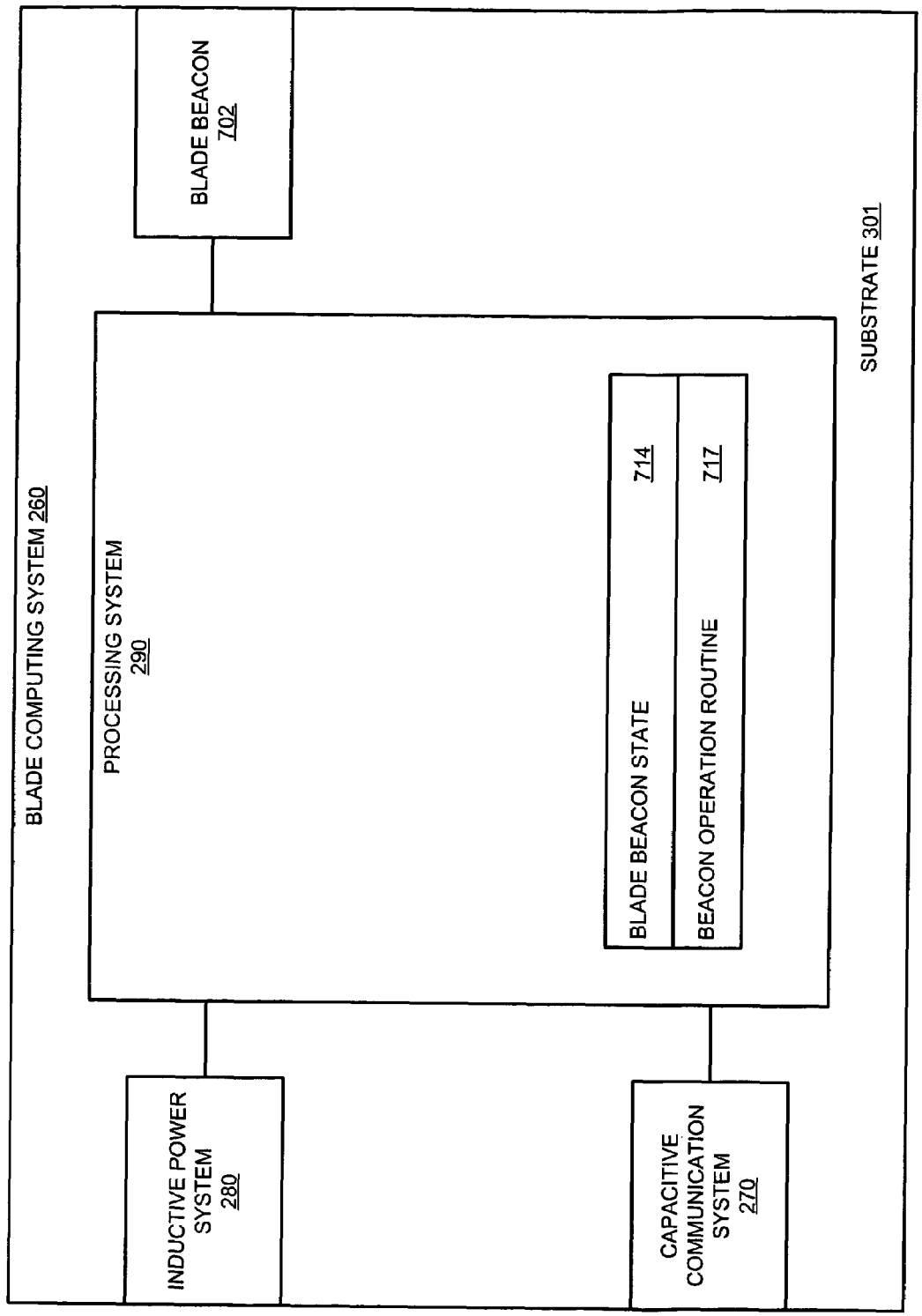
FIG. 7 shows the blade computing system according to another embodiment of the invention.

FIG. 7 shows the blade computing system 260 according to another embodiment of the invention. The blade computing system 260 in this embodiment includes the capacitive communication system 270, the inductive power system 280, the processing system 290, and the substrate 301, as previously discussed. In addition, the blade computing system 260 includes a blade beacon 702. Further, the processing system 290 can include a blade beacon state 714 and a beacon operation routine 717.

The blade server system 200 can include a very large number of blade computing systems 260A-260N (see FIG. 2). All of the blade computing systems 260A-260N in the blade server system 200 are essentially identical. Therefore, in order to perform any manner of troubleshooting, servicing, repair, replacement, installation, etc., a particular blade computing system will need to be identified. The identification of a particular blade computing system 260 therefore may require tedious tracing of cables, addresses, serial numbers, etc. This is difficult and time consuming.

In contrast, the invention provides the blade beacon 702. In operation, the blade computing system 260 can receive a beacon message. A technician or operator can send a beacon message that is addressed to the particular blade computing system 260. Consequently, the beacon message can generate a particular blade indication that can be used to find and identify the particular blade computing system 260.

The blade beacon 702 in one embodiment comprises a light. For example, the blade beacon 702 can comprise an incandescent light, a fluorescent light, or a Light Emitting Diode (LED). However, the blade beacon 702 can comprise other lights, indicators, or displays.

Figure 8:
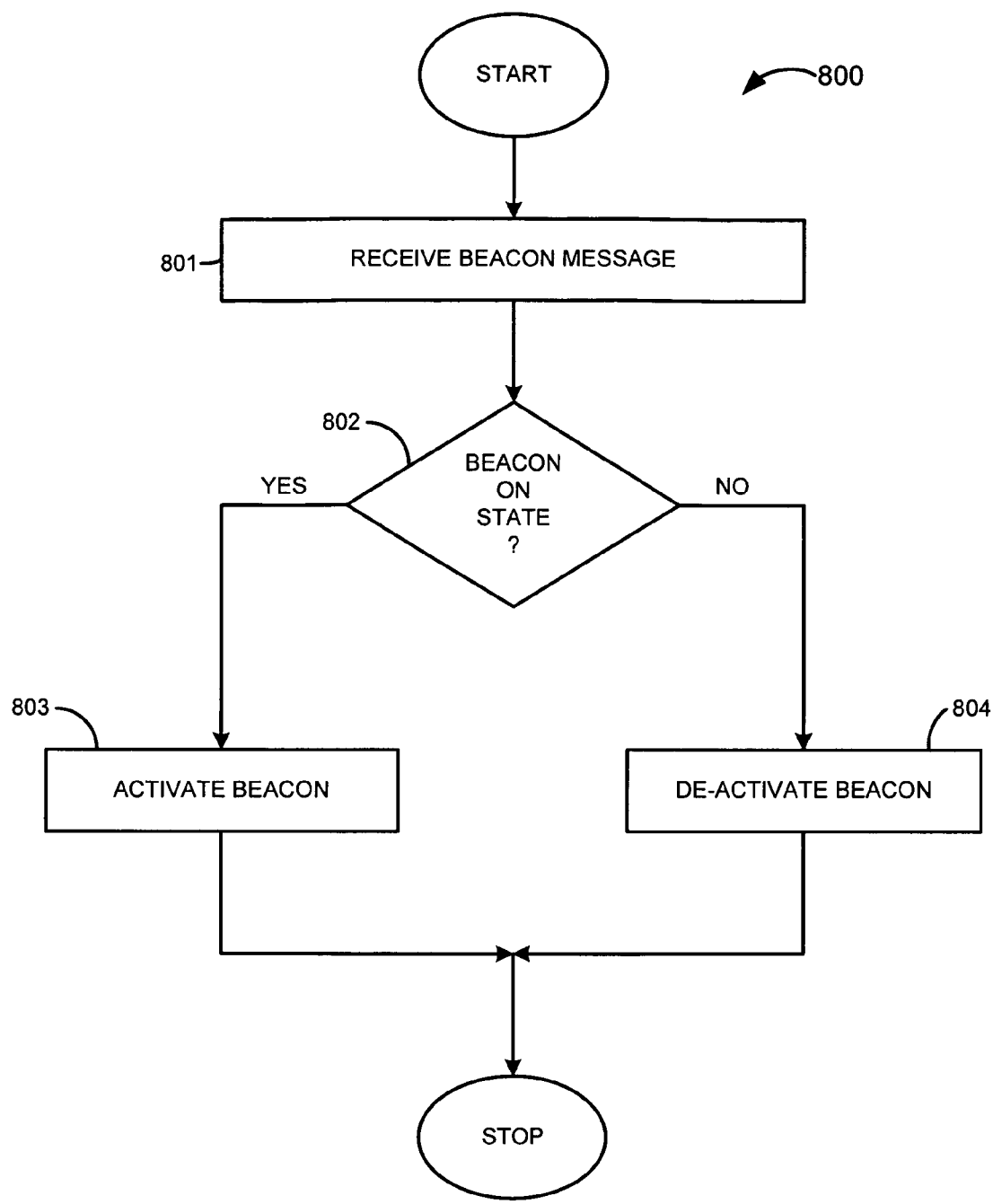
FIG. 8 is a flowchart of a method of activating a blade beacon according to an embodiment of the invention.

FIG. 8 is a flowchart of a method of activating a blade beacon according to an embodiment of the invention. In step 801, the blade computing system 260 receives a beacon message, as previously discussed.

In step 802, the processing system 290 of the blade computing system 260 determines whether the beacon message includes a beacon ON state or a beacon OFF state. If the beacon message includes a beacon ON state, the method proceeds to step 803. If the beacon message includes a beacon OFF state, the method proceeds to step 804.

In step 803, because a beacon ON state has been received, the processing system 290 activates the blade beacon 702. The blade beacon 702 enables visual identification of the selected blade computing system 260.

In step 804, because a beacon OFF state has been received, the processing system 290 de-activates the blade beacon 702. In this manner, a technician or operator can activate and de-activate specific blade beacons of the blade server system 200 and can identify individual blade computing systems.

Figure 9:
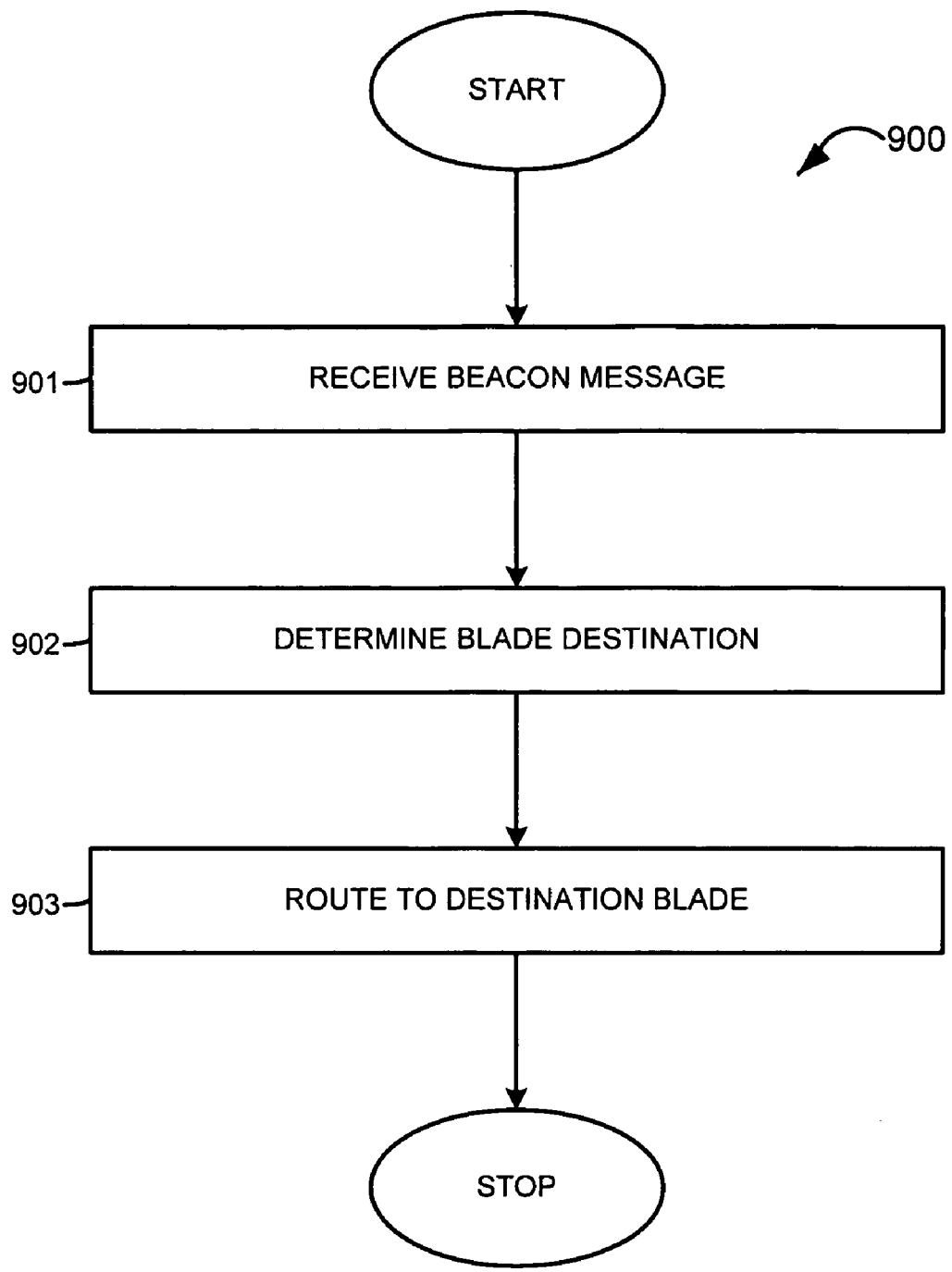
FIG. 9 is a flowchart of a method of activating a blade beacon of a blade computing system in a blade server system according to an embodiment of the invention.

FIG. 9 is a flowchart 900 of a method of activating a blade beacon 702 of a blade computing system in a blade server system 200 according to an embodiment of the invention. In step 901, the blade server system 200 receives a beacon message.

In step 902, the blade server system 200 determines a blade destination of the beacon message. The beacon message includes an address (or other identifier) that targets a specific blade computing system 260X of the blade computing systems 260A-260N.

In step 903, the blade server system 200 routes the beacon message to the specified blade computing system 260X. The specified blade computing system 260X can subsequently activate its blade beacon 702, as previously discussed in FIG. 8.

FIG. 10 shows a blade computing system 260 according to another embodiment of the invention. The blade computing system 260 includes the capacitive communication system 270, the inductive power system 280, the processing system 290, and the substrate 301, as previously discussed. In addition, the blade computing system 260 includes one or more non-contact retaining devices 1006. A blade space 404 of the blade server system 200 can include corresponding devices, if needed. The non-contact retaining devices 1006 retain the blade computing system 260 in the blade server system 200. Multiple non-contact retaining devices 1006 can be included in order to ensure stability of the blade computing system 260 in the blade server system 200.

In one embodiment, a non-contact retaining device 1006 comprises a magnet, such as a permanent magnet or an electromagnet. As stated above, a corresponding blade space 404 can include a magnet of opposite polarity to increase the retaining capability. It should be understood that other non-contact retaining devices are contemplated and are within the scope of the description and claims.

A blade computing system and method according to the invention can be employed according to any of the embodiments in order to provide several advantages, if desired. The invention can inductively transfer electrical power to individual blade servers. The invention can transfer electrical power to individual blade servers without physically contacting the individual blade servers. The invention can capacitively transfer data to and from individual blade servers. The invention can transfer data to and from individual blade servers without physically contacting the individual blade servers. The invention can provide an operational status selection capability. The invention can provide an operational status indication capability. The invention can provide a blade beacon capability. The invention can provide a blade indication in response to a beacon message. The invention can provide a beacon indication on a specified blade computing system. The invention can provide a non-contact retaining capability for a blade computing system of a blade server system. The non-contact retaining capability retains a blade computing system without mechanically engaging the blade computing system to the blade server system.

What is claimed is:

1. A blade computing system, comprising:
   a substrate;
   at least one capacitive communication system formed on the substrate and configured to capacitively exchange data communications;
   at least one inductive power system formed on the substrate and configured to inductively receive electrical power;
   one or more baffles formed on the substrate and positioned between a capacitive communication system of the at least one capacitive communication system and an inductive power system of the at least one inductive power system; and
   a processing system formed on the substrate and coupled to the inductive power system and the capacitive communication system.

2. The blade computing system of claim 1, with a baffle of the one or more baffles providing a predetermined physical separation between the capacitive communication system and the inductive power system.

3. The blade computing system of claim 1, with a baffle of the one or more baffles providing electromagnetic shielding between the capacitive communication system and the inductive power system.

4. The blade computing system of claim 1, with a baffle of the one or more baffles providing a predetermined spacing between the capacitive communication system and the inductive power system.

5. The blade computing system of claim 1, further comprising a status selector system formed on the substrate and configured to generate a status input and with the processing system being further configured to receive the status input from the status selector system, set the operational status of the blade computing system based on a current operational status and the status input, and implement the operational status in the blade computing system.

6. The blade computing system of claim 1, further comprising a blade beacon formed on the substrate and configured to generate a beacon display and wherein the processing system is further configured to receive a beacon message through the at least one capacitive communication system, activate the blade beacon if a beacon on state is indicated by the beacon message, and de-activate the blade beacon if a beacon off state is indicated by the beacon message.

7. The blade computing system of claim 6, with the processing system being further configured to activate the blade beacon upon receiving a beacon message addressed to the blade computing system.

8. The blade computing system of claim 1, further comprising one or more non-contact retaining devices formed on the substrate and configured to retain the blade computing system in a blade server system.

9. A blade computing system, comprising:
   a substrate;
   a status selector system formed on the substrate and configured to generate a status input; and
   a processing system formed on the substrate and coupled to the status selector system, with the processing system being configured to receive the status input from the status selector system, set the operational status of the blade computing system based on a current operational status and the status input, and implement the operational status in the blade computing system.

10. The blade computing system of claim 9, further comprising:
    at least one capacitive communication system formed on the substrate and configured to capacitively exchange data communications, with the at least one capacitive communication system being coupled to the processing system; and
    at least one inductive power system formed on the substrate and configured to inductively receive electrical power, with the at least one inductive power system being coupled to the processing system.

11. The blade computing system of claim 10, further comprising one or more baffles formed on the substrate and positioned between a capacitive communication system of the at least one capacitive communication system and an inductive power system of the at least one inductive power system.

12. The blade computing system of claim 10, further comprising a blade beacon formed on the substrate and configured to generate a beacon display and wherein the processing system is further configured to receive a beacon message through the at least one capacitive communication system, activate the blade beacon if a beacon on state is indicated by the beacon message, and de-activate the blade beacon if a beacon off state is indicated by the beacon message.

13. The blade computing system of claim 12, with the processing system being further configured to activate the blade beacon upon receiving a beacon message addressed to the blade computing system.

14. The blade computing system of claim 9, further comprising one or more non-contact retaining devices formed on the substrate and configured to retain the blade computing system in a blade server system.

15. A blade computing system for a blade server system, the blade computing system comprising:
- a substrate;
- a blade beacon formed on the substrate and configured to generate a beacon display; and
- a processing system formed on the substrate and coupled to the blade beacon, with the processing system being configured to receive a beacon message, activate the blade beacon if a beacon on state is indicated by the beacon message, and de-activate the blade beacon if a beacon off state is indicated by the beacon message.

16. The blade computing system of claim 15, further comprising:
- at least one capacitive communication system formed on the substrate and configured to capacitively exchange data communications, with the at least one capacitive communication system being coupled to the processing system and with the beacon message being received through the at least one capacitive communication system; and
- at least one inductive power system formed on the substrate and configured to inductively receive electrical power, with the at least one inductive power system being coupled to the processing system.

17. The blade computing system of claim 15, with the blade beacon comprising a light.

18. The blade computing system of claim 15, with the blade beacon comprising a Light Emitting Diode (LED).

19. The blade computing system of claim 15, with the processing system being further configured to activate the blade beacon upon receiving a beacon message addressed to the blade computing system.

20. The blade computing system of claim 16, further comprising one or more baffles formed on the substrate and positioned between a capacitive communication system of the at least one capacitive communication system and an inductive power system of the at least one inductive power system.

21. The blade computing system of claim 15, further comprising a status selector system formed on the substrate and configured to generate a status input and with the processing system being further configured to receive the status input from the status selector system, set the operational status of the blade computing system based on a current operational status and the status input, and implement the operational status in the blade computing system.

22. The blade computing system of claim 15, further comprising one or more non-contact retaining devices formed on the substrate and configured to retain the blade computing system in a blade server system.

23. A blade computing system for a blade server system, the blade computing system comprising:
- a substrate;
- one or more non-contact retaining devices formed on the substrate and configured to retain the blade computing system in the blade server system; and
- a processing system formed on the substrate.

24. The blade computing system of claim 23, further comprising:
- at least one capacitive communication system formed on the substrate and configured to capacitively exchange data communications, with the at least one capacitive communication system being coupled to the processing system; and
- at least one inductive power system formed on the substrate and configured to inductively receive electrical power, with the at least one inductive power system being coupled to the processing system.

25. The blade computing system of claim 24, further comprising one or more baffles formed on the substrate and positioned between a capacitive communication system of the at least one capacitive communication system and an inductive power system of the at least one inductive power system.

26. The blade computing system of claim 23, further comprising a status selector system formed on the substrate and configured to generate a status input and with the processing system being further configured to receive the status input from the status selector system, set the operational status of the blade computing system based on a current operational status and the status input, and implement the operational status in the blade computing system.

27. The blade computing system of claim 24, further comprising a blade beacon formed on the substrate and configured to generate a beacon display and wherein the processing system is further configured to receive a beacon message through the at least one capacitive communication system, activate the blade beacon if a beacon on state is indicated by the beacon message, and de-activate the blade beacon if a beacon off state is indicated by the beacon message.

28. The blade computing system of claim 27, with the processing system being further configured to activate the blade beacon upon receiving a beacon message addressed to the blade computing system.

29. The blade computing system of claim 23, with a non-contact retaining device of the one or more non-contact retaining devices comprising a magnet.

30. A method of setting an operational status of a blade computing system, the method comprising:
- receiving a manual status input in a status selector system of the blade computing system;
- setting the operational status of the blade computing system based on a current operational status and the manual status input; and
- implementing the operational status in the blade computing system.

31. The method of claim 30, further comprising indicating the new operational status in a status indicator system of the blade computing system.

32. A method of activating a blade beacon of a blade computing system of a blade server system, the method comprising:
- receiving a beacon message in the blade computing system;
- activating the blade beacon if a beacon on state is indicated by the beacon message; and de-activating the blade beacon if a beacon off state is indicated by the beacon message.

33. A method of activating a blade beacon of a particular blade computing system of a blade server system that includes a plurality of blade computing systems, the method comprising:

receiving a beacon message in the blade server system;
determining that a destination of the beacon message is the particular blade computing system; and
routing the beacon message to the particular blade computing system.

\* \* \* \* \*